E. B. ROBY.
AUTOMATIC FEEDING MACHINE.
APPLICATION FILED OCT. 4, 1913.
1,170,492.
Patented Feb. 1, 1916.
14 SHEETS—SHEET 1.
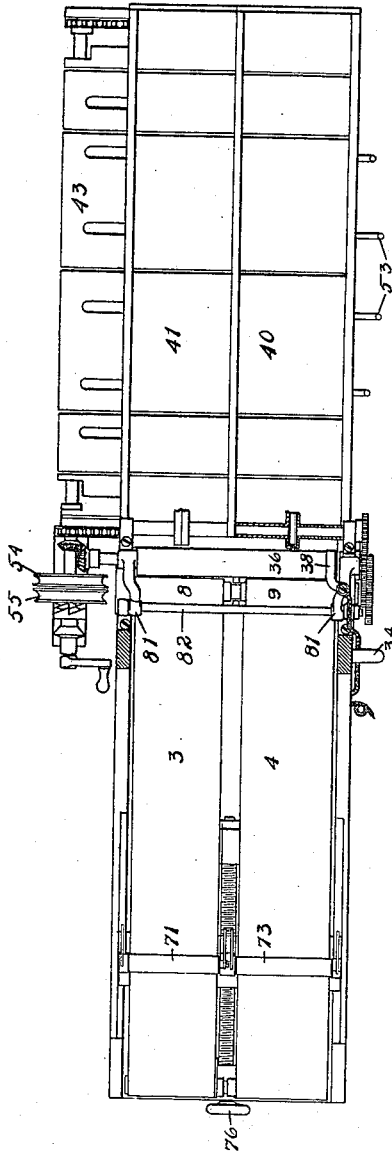
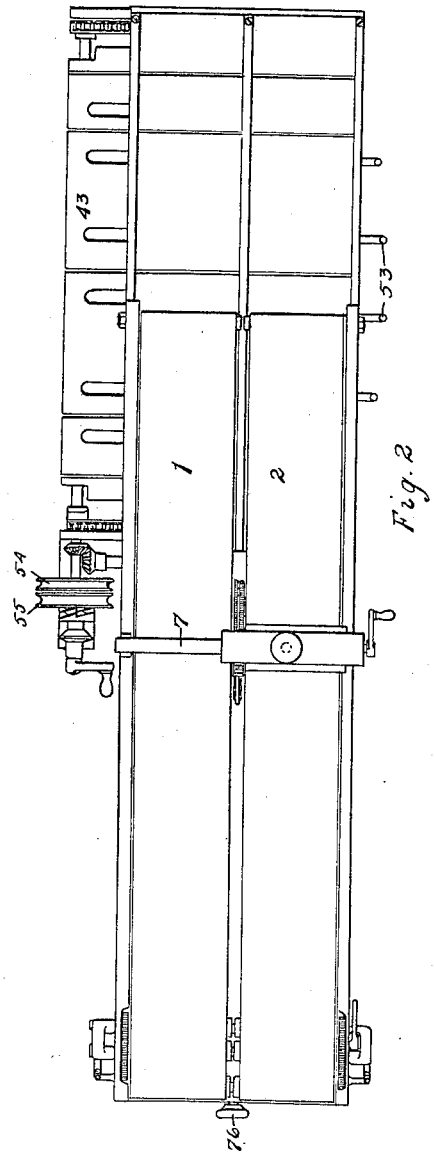

E. B. ROBY.
AUTOMATIC FEEDING MACHINE.
APPLICATION FILED OCT. 4, 1913.

1,170,492.

Patented Feb. 1, 1916.
14 SHEETS—SHEET 2.

WITNESSES:
Reta Van Der Volgen
Jay A. Robinson

INVENTOR
Edward B. Roby
BY
Walter E. Ward
ATTY.

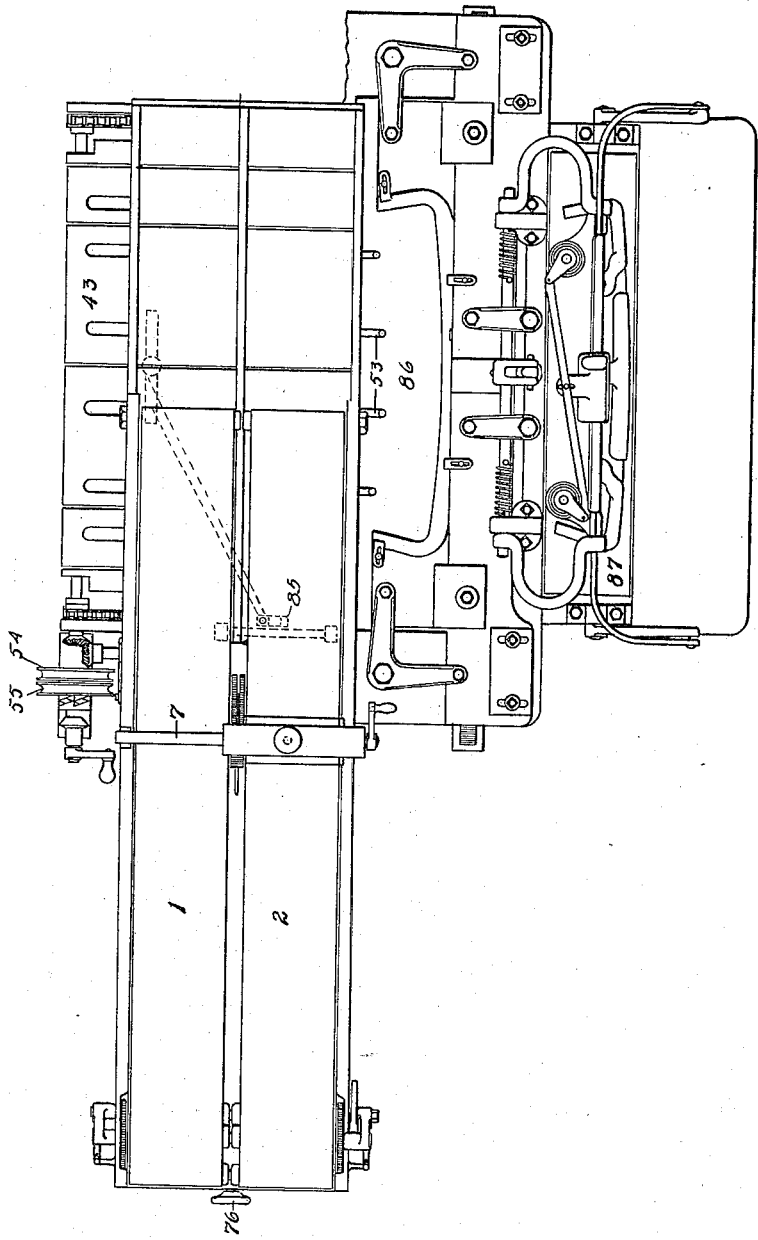

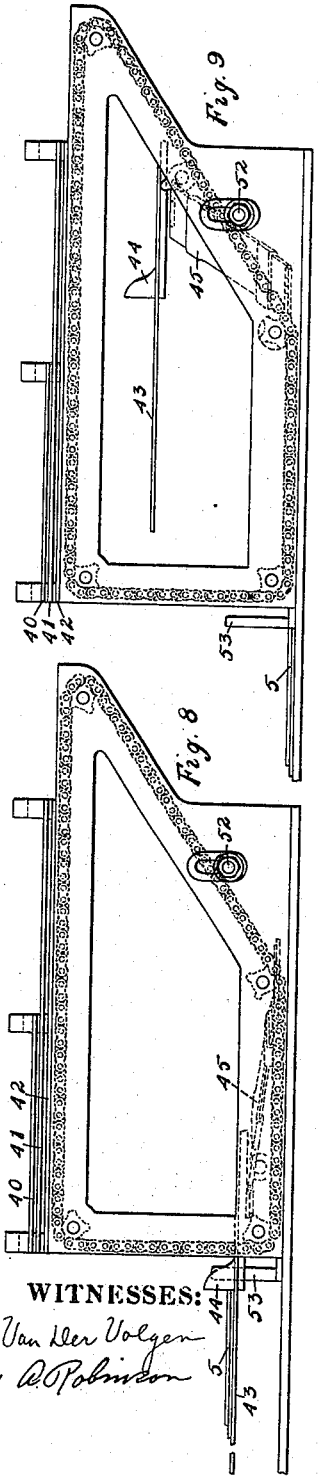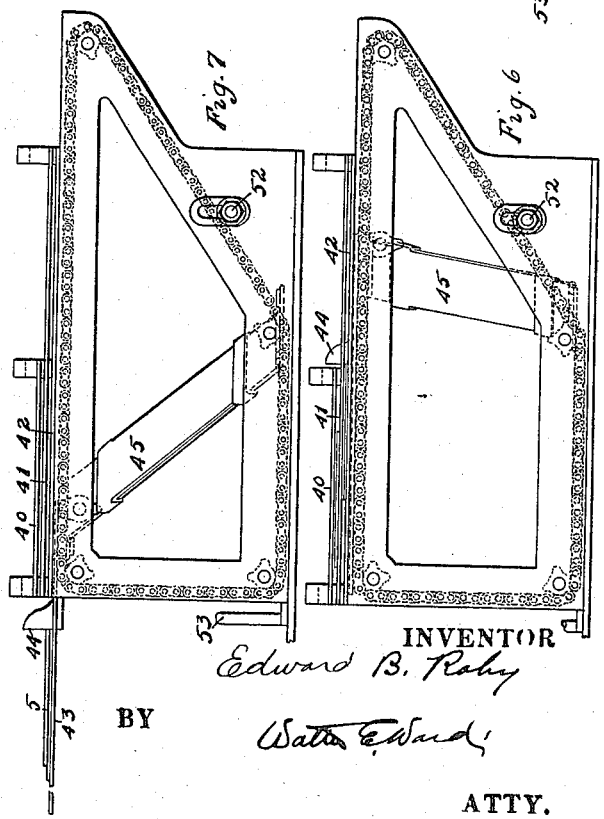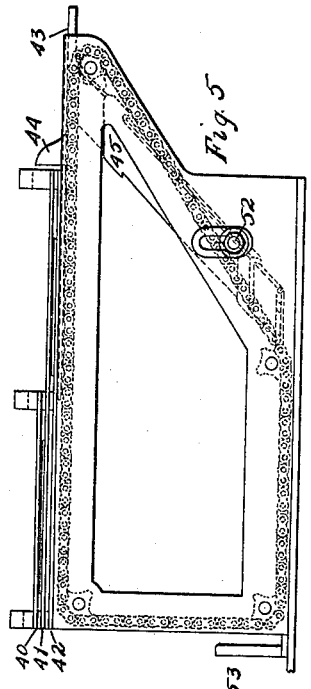

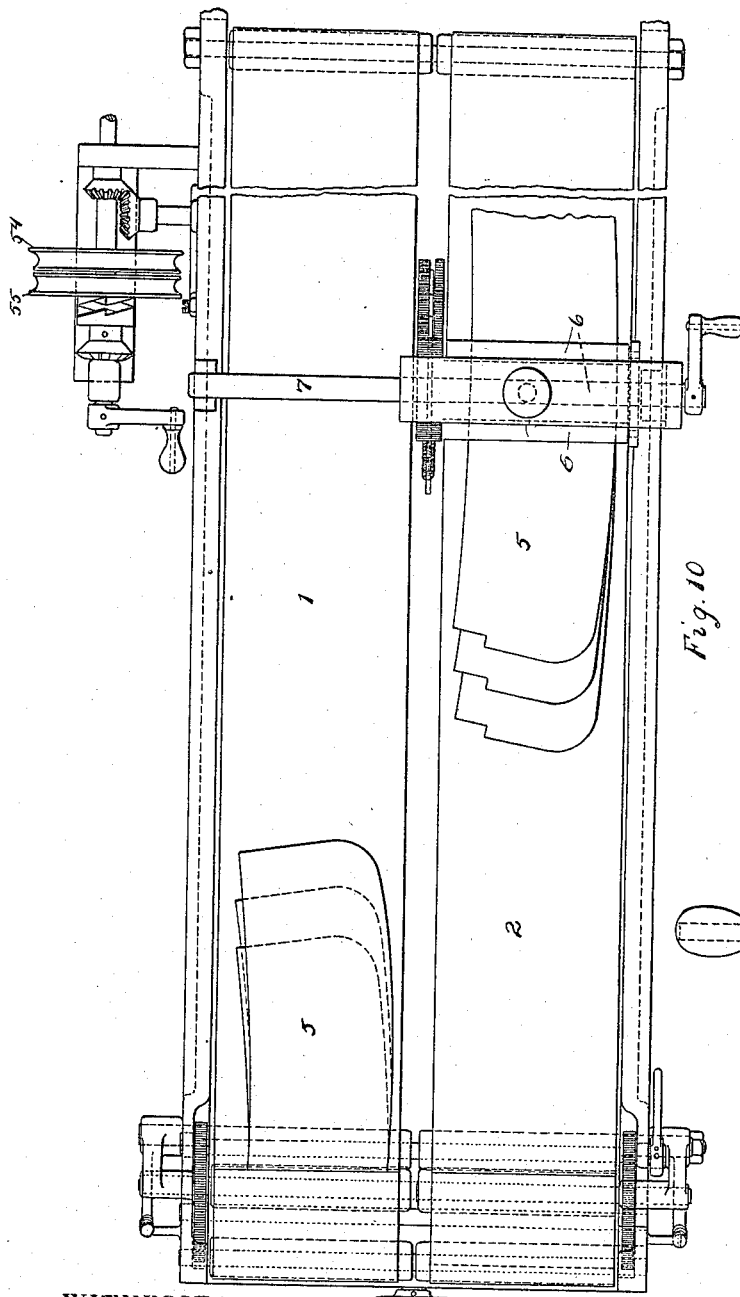

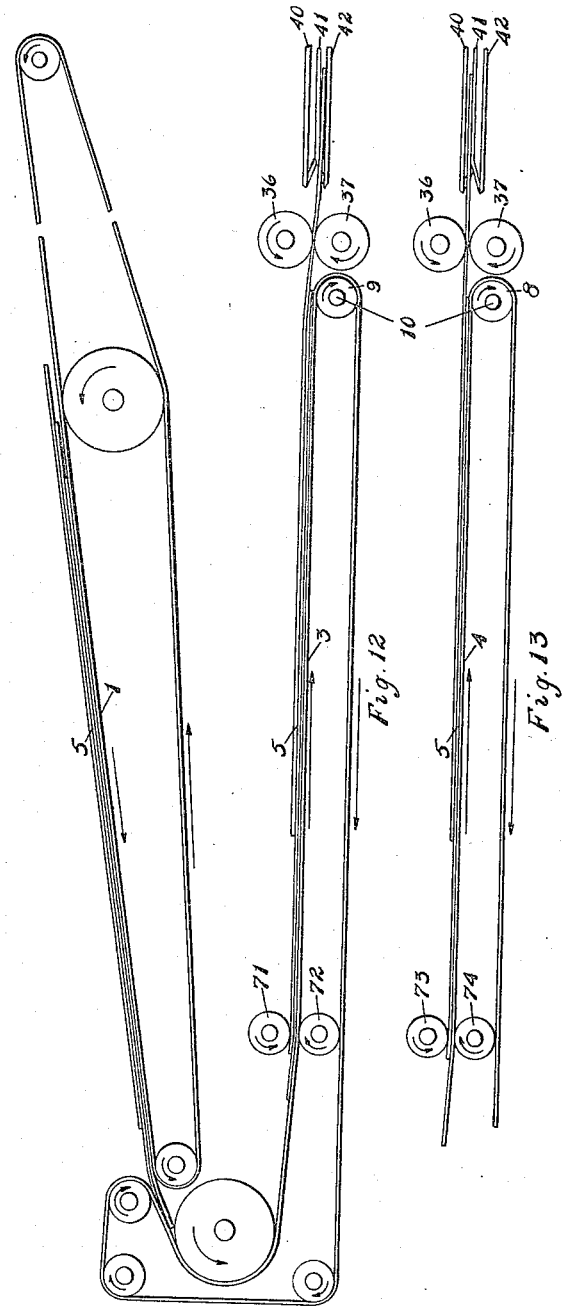

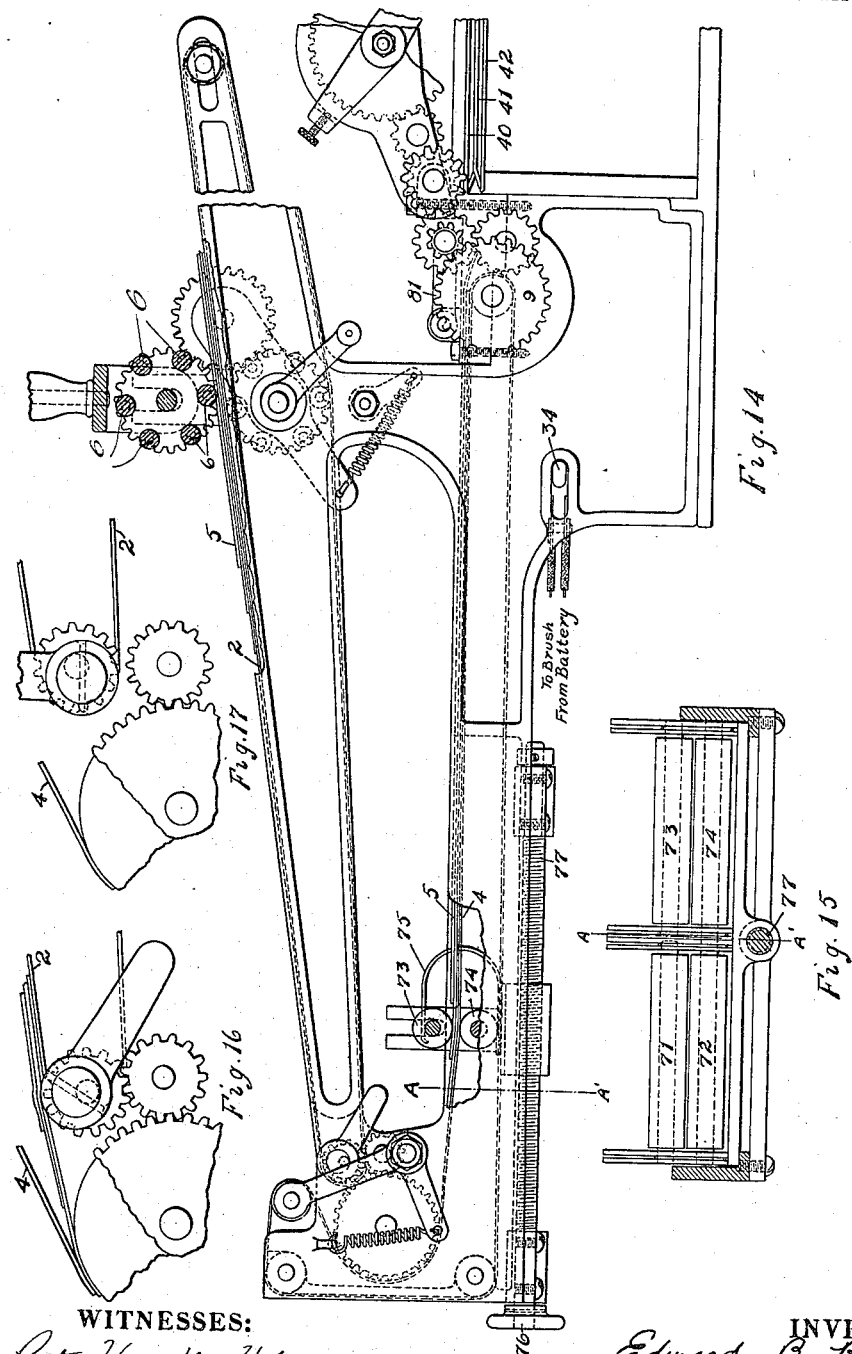

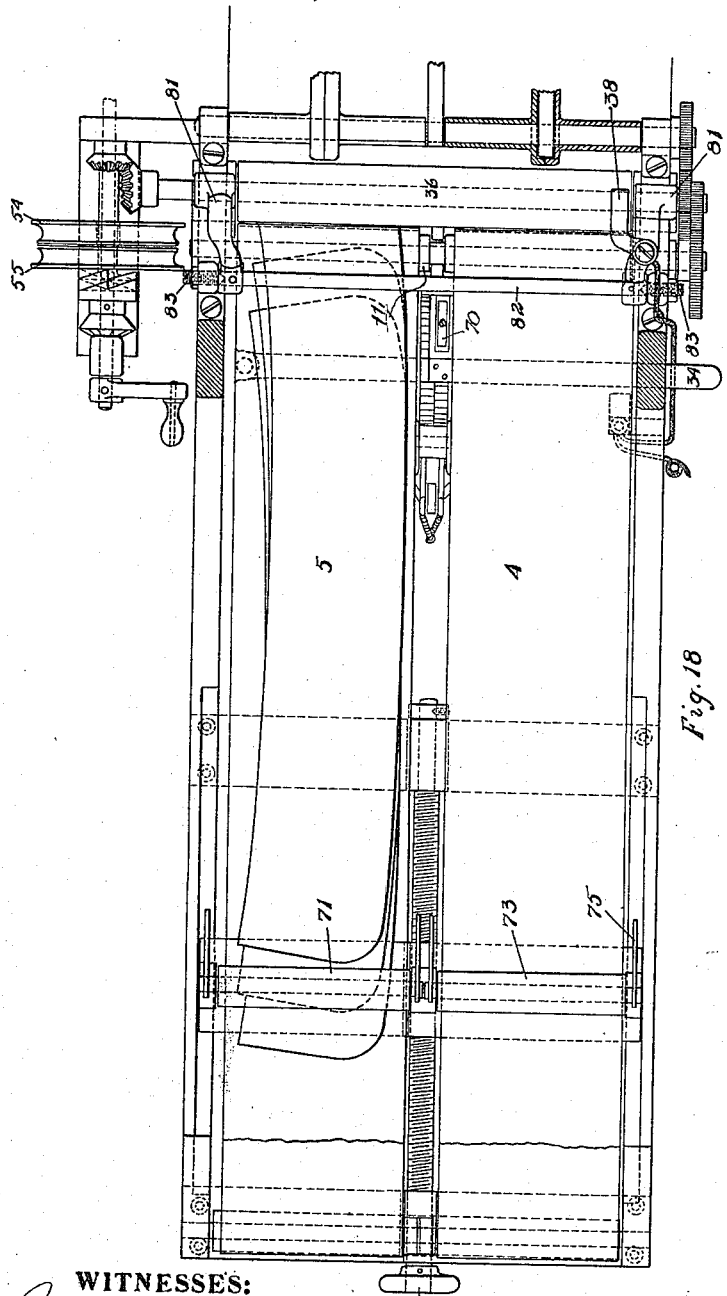

E. B. ROBY.
AUTOMATIC FEEDING MACHINE.
APPLICATION FILED OCT. 4, 1913.
1,170,492.
Patented Feb. 1, 1916.
14 SHEETS—SHEET 9.
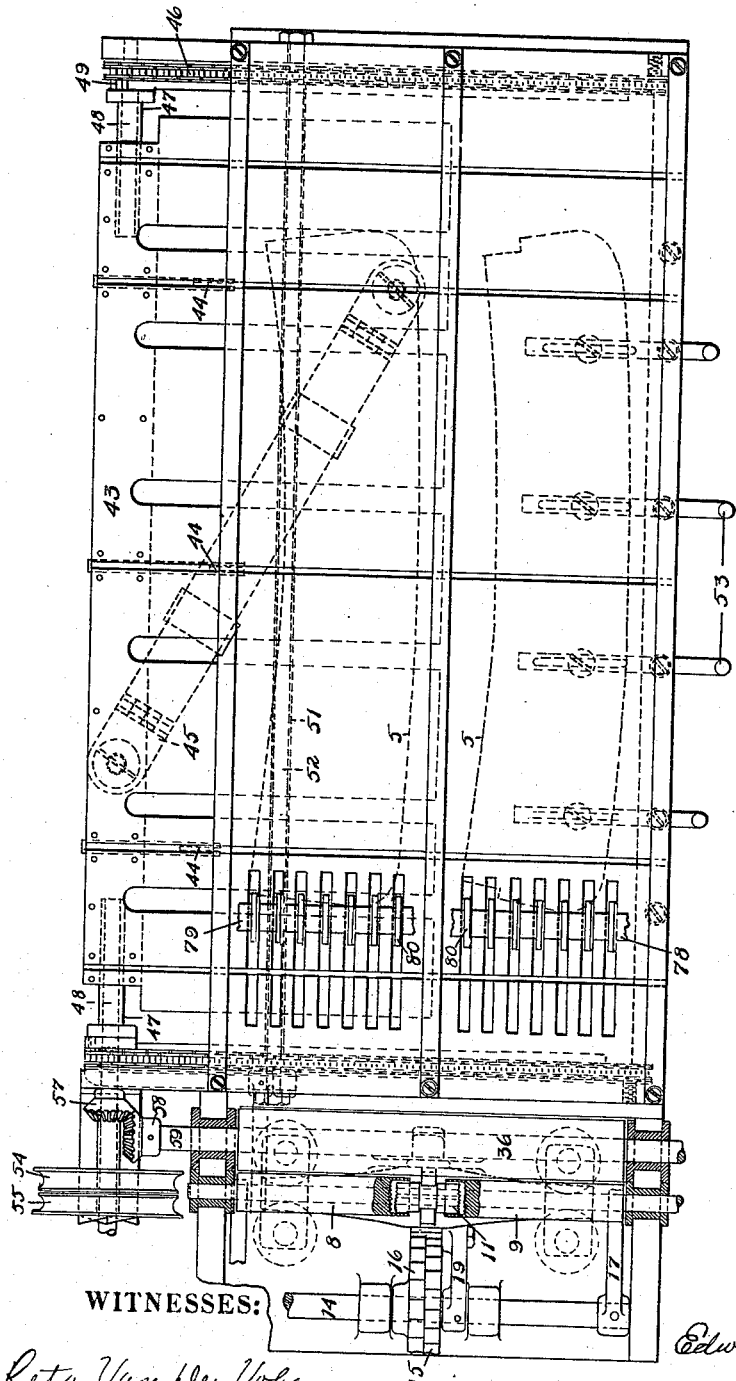
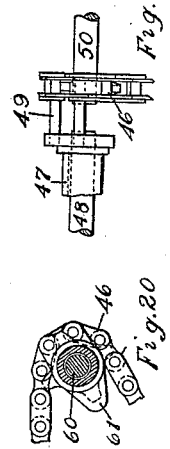
WITNESSES:
INVENTOR
Edward B. Roby
BY
Walter E. Ward
ATTY.

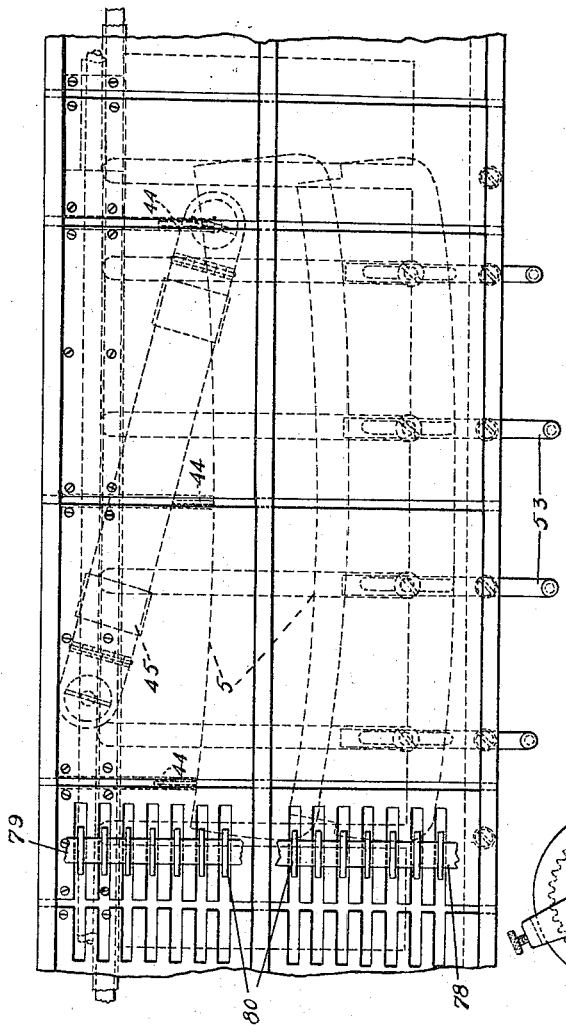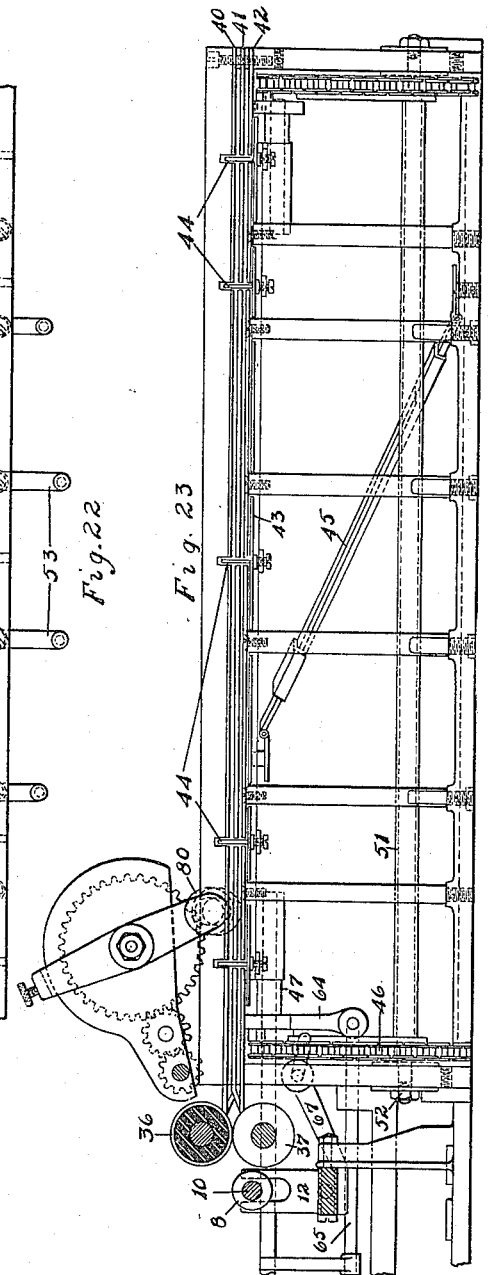

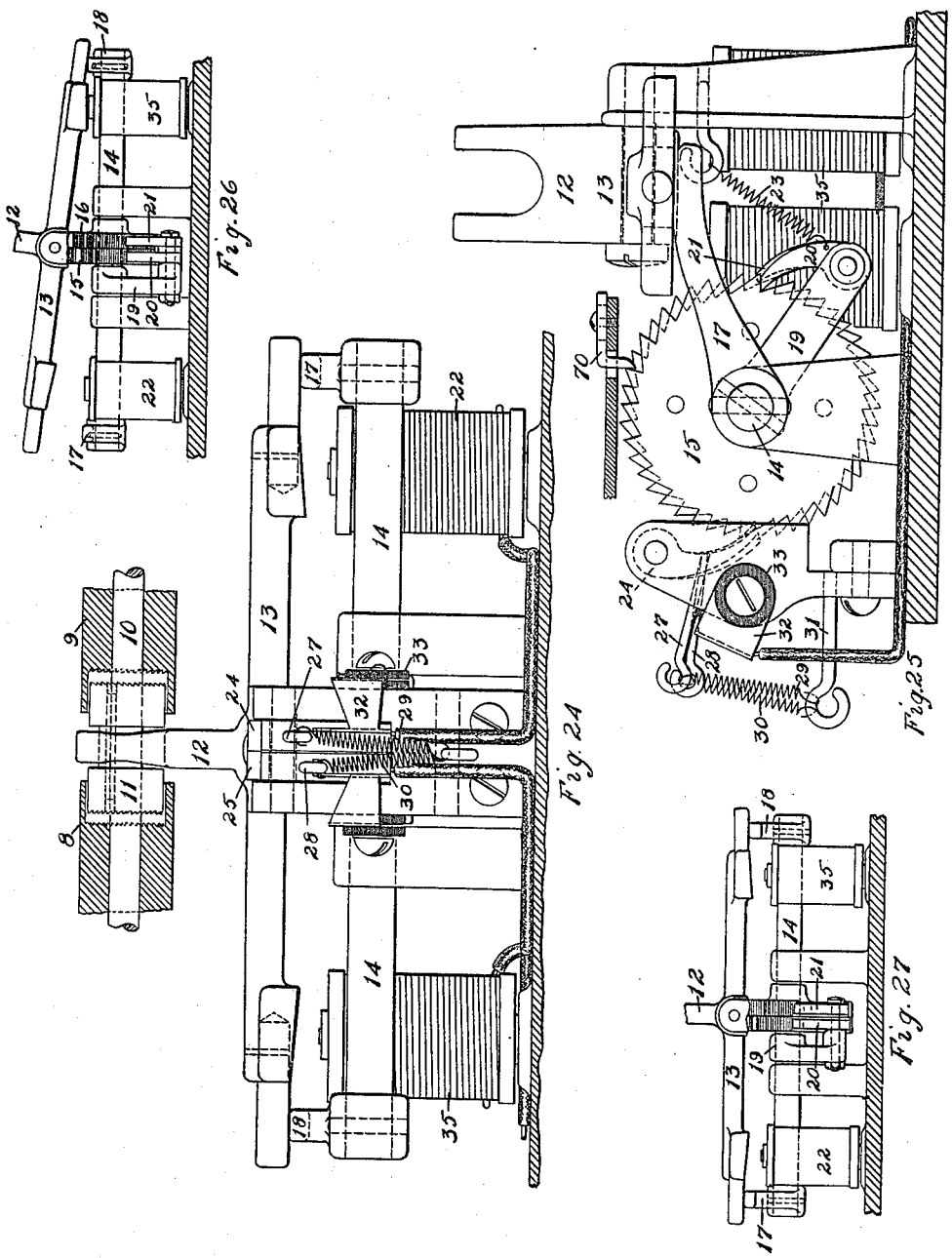

E. B. ROBY.
AUTOMATIC FEEDING MACHINE.
APPLICATION FILED OCT. 4, 1913.

1,170,492.

Patented Feb. 1, 1916.
14 SHEETS—SHEET 12.

WITNESSES:
Reta Van Der Volgen
Jay A. Robinson

INVENTOR
Edward B. Roby
BY
Walter E. Ward
ATTY.

E. B. ROBY.
AUTOMATIC FEEDING MACHINE.
APPLICATION FILED OCT. 4, 1913.
1,170,492.
Patented Feb. 1, 1916.
14 SHEETS—SHEET 13.
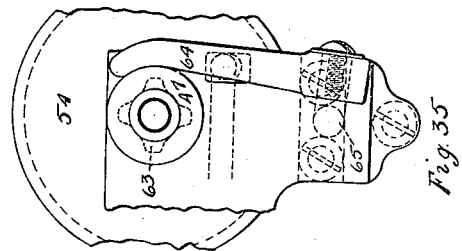
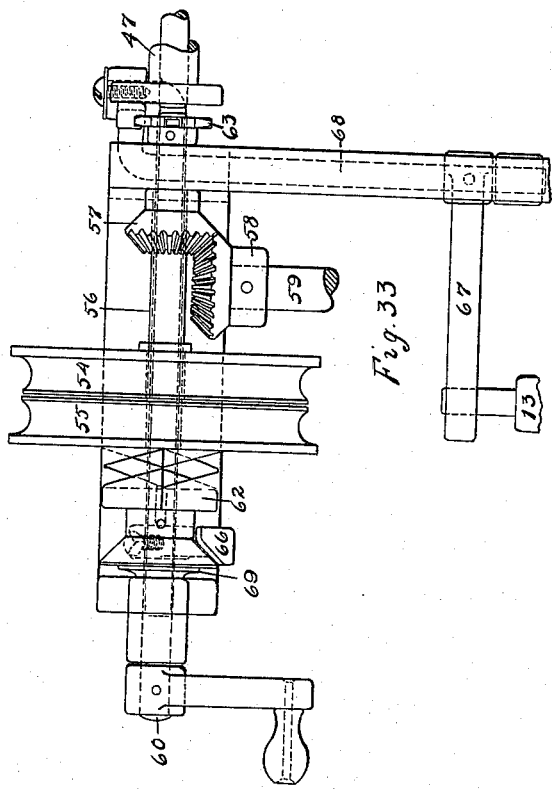
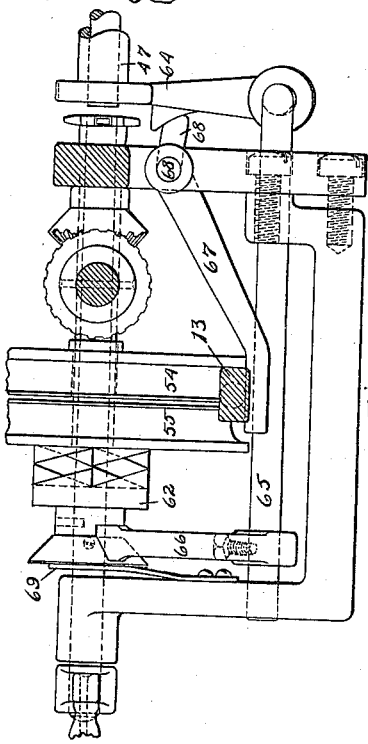
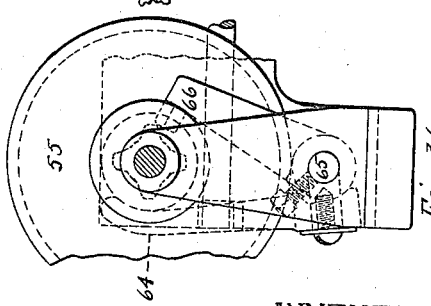
WITNESSES
Reta Van Der Volgen
Jay A. Robinson
INVENTOR
Edward B. Roby
BY
Walter E. Ward
ATTY

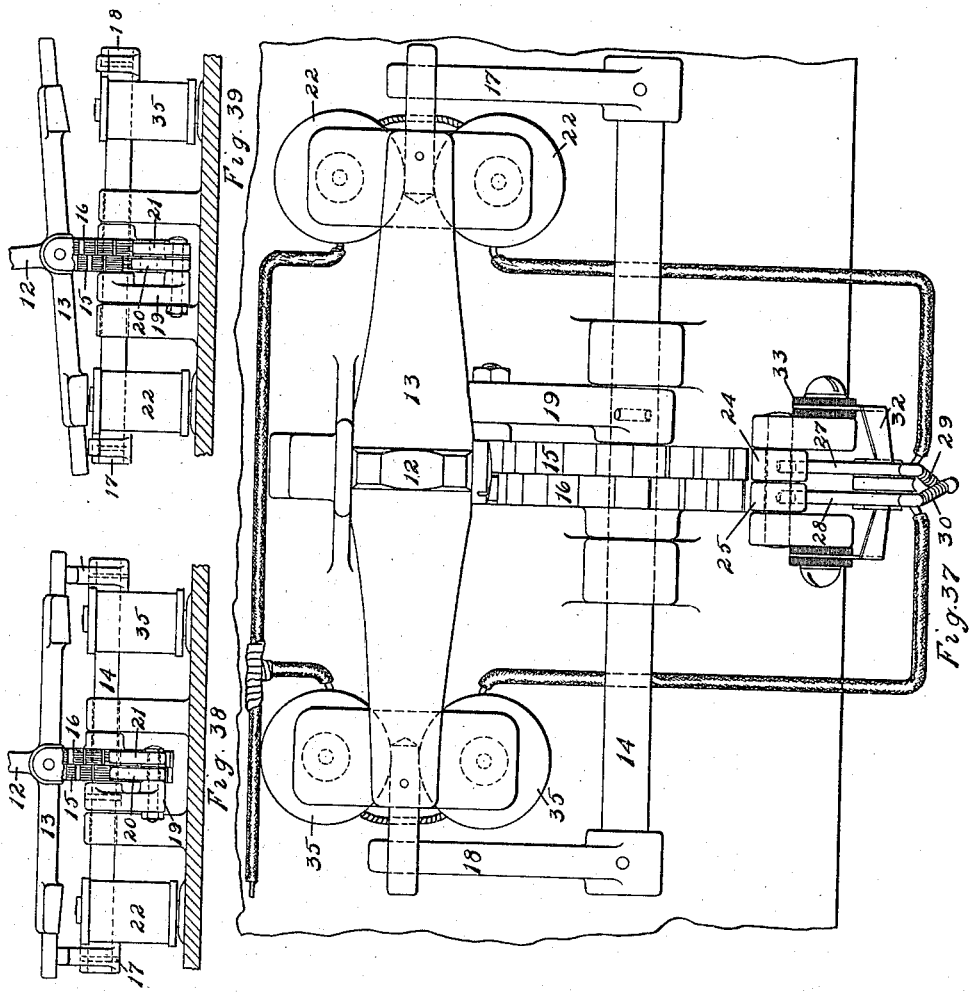

UNITED STATES PATENT OFFICE.

EDWARD B. ROBY, OF TROY, NEW YORK, ASSIGNOR TO MARGARET L. HEALD, OF COLONIE, NEW YORK.

AUTOMATIC FEEDING-MACHINE.

1,170,492. Specification of Letters Patent. Patented Feb. 1, 1916.

Application filed October 4, 1913. Serial No. 793,354.

*To all whom it may concern:*

Be it known that I, EDWARD B. ROBY, a citizen of the United States, residing at Troy, in the county of Rensselaer and State of New York, have invented certain new and useful Improvements in Automatic Feeding-Machines, of which the following is a specification.

My invention relates to feeding machines and the objects of my invention are to construct a machine which will feed goods of different character or material alternately between rolls and lay them smoothly and uniformly on tables so as to be folded, stitched together or glued or otherwise treated by a separate and independent machine or by any other means and the different materials are put together as by a machine for folding collars or cuffs or any other purpose. I accomplish these objects by means of the mechanism illustrated in the accompanying drawings, in which—

Figure 3:
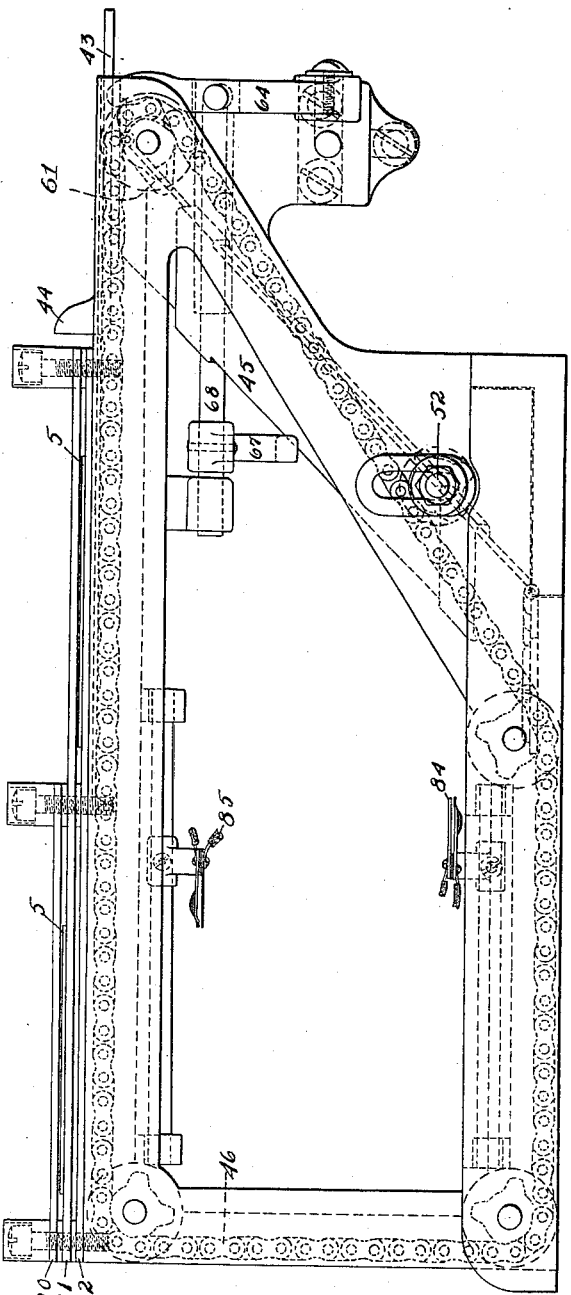

Figure 1 is a top plan view with the upper belts removed. Fig. 2 is a top plan view with the upper belts on the rolls ready for use. Fig. 3 is an elevation of the rear end of the machine. Fig. 4 is a top plan view of my feeding machine attached to a folding machine used for the purpose of delivering collar blanks on to the bed-plate of the folding machine. Figs. 5, 6, 7, 8 and 9 are rear end views showing the different positions of the carrying plate in carrying goods from the feeding machine to the receiving table. Fig. 10 is a top plan view, partly broken away, of the endless belts carrying the goods to the feed rolls. Fig. 11 is a side view of the roll for combing out the goods. Fig. 12 is a longitudinal section of the endless belt on the back side of the machine carrying the goods to the feed-rolls. Fig. 13 is a longitudinal section of a portion of the front belt carrying the goods to the feed-rolls. Fig. 14 is a front side view of my feeding machine with the extreme rear broken away showing the portion of the feed-roll conveying the goods, down to and including the lower belt. Fig. 15 is a sectional view showing the rolls for holding the goods. Figs. 16 and 17 are detailed views of the engaging mechanism between the upper and lower belts. Fig. 18 is a top plan view of the lower belt of the feeding machine, showing portions of the lower conveying belt. Fig. 19 is a top plan view of the stationary plates of the machine upon which the goods are deposited after leaving the feed-rolls. Figs. 20 and 21 are detailed views showing the endless chain connection to the carrying plate. Fig. 22 is a top plan view of the stationary plates upon which the goods are deposited, showing the carrying plate in different position from that shown in Fig. 19. Fig. 23 is a side elevation, partly in section, of the plates upon which the goods are deposited after leaving the feed rolls. Fig. 24 is an end elevation of the timing mechanism. Fig. 25 is a side elevation of the same. Figs. 26 and 27 are details of the timing mechanism. Figs. 28, 29, 30 and 31 and 32 are wiring diagrams for the timing mechanism. Figs. 33, 34, 35 and 36 are detailed views of the driving mechanism. Fig. 37 is a plan view of the timing mechanism. Figs. 38 and 39 are rear end views of same, showing rocking arm in different position.

Similar numerals refer to similar parts throughout the several views.

Heretofore in the manufacture of collars and cuffs and similar articles the blanks have been selected and fed to the folding or pasting machines by hand. Where two separate classes of goods are used, as in the manufacture of collars and cuffs, this requires separate operations to get the goods uniformly selected and placed upon the bed of the machines. Applicant's present invention is designed to feed the goods automatically to the folding, pasting or other machines, selecting the different grades or kinds of goods alternately and depositing them uniformly in position upon the bed of the folding or pasting machine and for any other purpose for which it may be required to feed the goods uniformly and accurately.

The machine consists generally of four endless conveyers for feeding the goods to the feeding rolls. These conveyers move alternately and are so timed that one piece of goods is deposited from one conveyer upon one plane of the plates and then another piece of goods of the same or different grade or material is deposited on another plate and then both the pieces are upon the plates so that the one comes directly over the other and the pieces are deposited accurately and uniformly upon the feeding bed or table, as may be desired.

Referring to the drawings, 1 and 2 represent the endless conveyers which are preferably endless belts or tapes and may be of any suitable material. 3 and 4 are corresponding lower belts. These belts may be mounted on rolls as shown in Figs. 12 and 13 or the same may be differently arranged as may most efficiently accomplish the purpose. The goods are placed upon the top conveyers and may be combed out by hand or machine so that the end of one piece of goods at a time will be caught by the rollers. The rollers 36 and 37 will feed the goods between the plates upon the lower plate as shown in Fig. 12 and the goods placed upon the conveyer 2 will be fed between the upper plates as shown in Fig. 13.

5, 5 represent the goods upon the endless conveyers 1 and 2. The goods shown in the drawings are blanks for collars which may be so combed that the bottom blank on conveyer 1 will be the top blank on conveyer 3 and will first come between the rollers 36 and 37 as shown in Fig. 12. By "combing" is meant the distribution of the goods lengthwise so that the ends do not in any case coincide with each other. This combing may be done by hand or by any suitable device such as is usually used for that purpose. Fig. 11 shows a roller for that purpose. These rollers may be of any suitable form. They are designed to be used in pairs; one mounted above the endless conveyer, and one mounted below the conveyer, opposite to the one mounted above it, and they are designed to be revolved in opposite directions. They are slidably mounted on shaft 7 so that the same combing rollers may be used on the different conveyers.

The conveyers are driven by the feed rolls 8 and 9. These feed rolls 8 and 9 are mounted loosely upon the same shaft as shown in Figs. 19 and 24. The shaft 10 carrying the feed rolls 8 and 9 has a clutch 11 which is adapted to engage alternately the feed roll 8 and the feed roll 9 as the clutch may be moved by the clutch fork 12, Fig. 24. When the clutch moves the feed roll 8 it will carry the goods deposited upon the conveyer 1 and when the clutch engages with and operates the feed roll 9 it will carry the goods placed upon the conveyer 2. The clutch fork 12 is a part of the rocking arm 13. The rocking arm 13 is mounted pivotally by any suitable support to the base of the machine. When the rocking arm 13 is rocked to the right it will throw the top part of the clutch fork 12 to the right moving the clutch. The clutch will engage the feed roll 9 and when the rocking arm 13 is rocked in the opposite direction it will disengage the clutch from the feed roll 9 and engage the clutch with the feed roll 8. When the rocking arm stands perfectly horizontal the clutch does not engage with either feed roll. The rocking arm 13 is operated electrically. The rocking arm 13 is a part of the timing mechanism of the feeding machine.

The shaft 14 is mounted in suitable bearings connected with the frame of the machine.

15 and 16 are two ratchet wheels mounted loosely on the shaft 14. The ratchet wheels 15 and 16 are fixedly attached together so that the teeth of one ratchet wheel come half way between the teeth of the other ratchet wheel. At the ends of the shaft 14 are fixedly attached the levers 17 and 18.

19 is an arm fixedly attached to the shaft 14 and the arm 19 has two pawls 20 and 21 pivoted thereon, adapted to engage the teeth of the ratchet wheels 15 and 16 respectively 22, 22 are magnets located under one end of the rocking arm 13. When the magnets 22, 22 are energized they draw down the end of the rocking arm 13 that is over those magnets. The rocking arm 13 at the same time draws down the lever 17 which is fixedly attached to the shaft 14 and rotates that shaft which in turn moves the arm 19 carrying the pawls 20 and 21, moving the pawls over the teeth of their respective ratchet wheels. When the electric current is broken the magnets 22, 22 are deenergized and the end of the rocking arm 13 is released. The springs 23, 23 exert the force against the pawls 20 and 21, moving the ratchets 15 and 16 the space of half a tooth. On the side of the ratchet wheels 15 and 16 opposite to the pawls 20 and 21 are pawls 24 and 25 which are similar to the pawls 20 and 21. The pawls 24 and 25 are loosely mounted upon the pin 26.

Attached to the pawl 24 is the bar 27 and attached to the pawl 25 is a similar bar 28. The bars 27 and 28 have the hook shaped ends farthest from the pawls. Attached to the bar 27 is a spring 29. Attached to the bar 28 is a spring 30. These springs are both attached at the lower end to the hook 31 which is fixedly attached in any suitable manner to the frame of the machine. The bars 27 and 28 form a part of a switch.

32 is a plate which is attached to the frame of the machine but insulated therefrom by insulating washer 33. The plate 32 is connected by a wire to the magnet 22 as above described. When the bar 27 comes into contact with the plate 32 it makes a circuit through that magnet and when the bar 27 is not in contact with the plate 32 that circuit is broken. The same is true in regard to the bar 28 with the plate 30 and magnet 35. The magnets are controlled by a switch mechanism as illustrated in Figs. 24 to 32.

Figure 30:
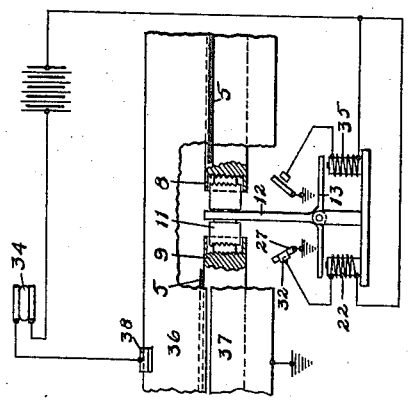
Figure 29:
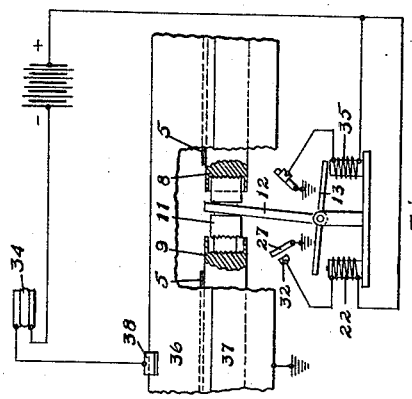
Figure 32:
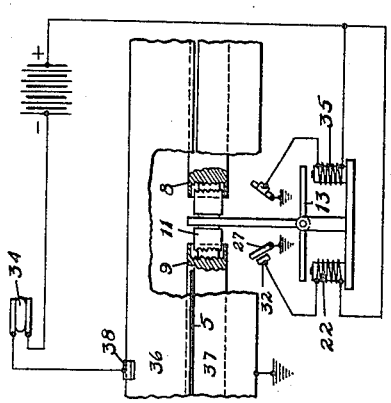
Figure 28:
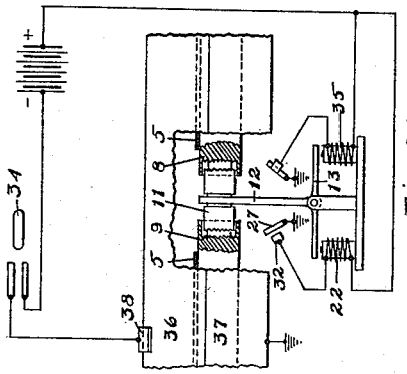
Figure 31:
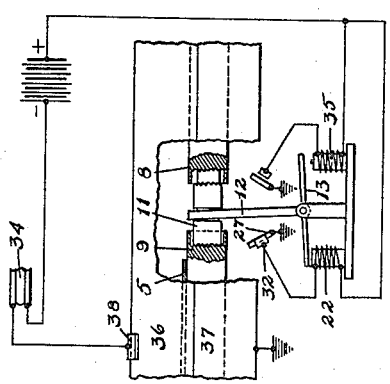

Referring to the diagrams Figs. 28 to 32, 34 is a lever for closing the switch of the battery circuit. This is also shown in Fig. 18 and will be hereafter described. When the bar 34 moves between the switch poles the circuit is closed and the magnet 35 is energized. When the circuit is closed as shown in Fig. 29, the magnet 35 is energized and draws down the end of the rocking arm 13 which is located above said magnet. When the rocking arm is down over the magnet 35 the clutch fork 12 tilts to the left as shown in Fig. 24 or to the right as shown in Fig. 29, moving the clutch so that it engages with the feed roll 8. Located beyond the feed rolls 8 and 9 and geared together with the feed rolls 8 and 9 or in any other suitable manner, are the rolls 36 and 37. The surface of the roll 36 is insulated from its shaft and has bearing upon it the brush 38. The peripheries of the feed rolls are conductors of electricity and when the circuit is closed the electricity is carried from the brush 38 to the roll 36 and communicated there with the roll 37 and from the roll 37 it grounds through the machine to the bar 28 and its electrical connections. When the collar blank enters between the rolls 36 and 37 this electrical connection is broken and the magnet 35 is no longer energized, and the rocking arm 13 is no longer drawn down but assumes the position as shown in Fig. 30 and the clutch is disengaged from the roll 8 and stops the movement of the feed belt 4. The rocking arm 13 is returned to a horizontal position as shown in Figs. 24 and 30 by the spring 23 acting upon the pawl 20 and revolving the ratchet 15 one-half the distance between two teeth. This action takes place when the current of electricity no longer energizes the magnet 35. When the ratchet 15 makes the movement of one-half the distance between two teeth, as stated, this brings down the bar 27 and makes the contact with the plate 32 as shown in Fig. 30. At the same time the collar blank which has broken the connection between the rolls 36 and 37 continues to move between the rolls 36 and 37 until the collar blank is passed out from between the rolls 36 and 37 as shown in Fig. 31, and those rolls again come into electrical contact with each other, energizing the magnet 22 and drawing down that end of the rocking arm. This moves the feed roll 9 and carries the feed belt upon which is deposited the collar blank and moves the blank along the endless belt 3 until the second collar blank comes between the rolls 36 and 37 and again breaks the circuit as above described and as shown in Fig. 32 and brings the rocking arm 13 to a horizontal position as shown in Figs. 28 and 24 and the other portions of said machine as shown in those figures.

The bar 34 is moved in position between the switch contacts by hand making electrical connections as shown in Fig. 29 and allowed to remain there during the operation of the machine. The shafts carrying the feed rolls 8 and 9 are geared to the rolls 36 and 37 and are operated by power in any desired manner, preferably as shown in Fig. 18. The rolls 8 and 9 reach only half way across and are loosely mounted upon the shaft 10 and the rolls 36 and 37 are fixedly mounted upon their respective shafts and are geared together. The goods come from between the rolls 36 and 37 to between the plates 40, 41 and 42. The cover or outside is preferably run between the plates 41 and 42 and the lining between the plates 40 and 41. This allows them to rest in different planes. This is so that they can be moved outwardly and discharged from the plates with the blank on the upper plane exactly over the blank on the lower plane so that they may be pasted or folded or attached together as may be desired. The plates 40, 41 and 42 are stationary plates. The blanks are removed from these plates by the carrying plate 43. This is best represented in Figs. 3, 5, 6, 7, 8 and 9. The plates 40, 41 and 42 have cross-slots. Within the cross-slots are the gages 44, 44, 44 attached to the carrying plate 43, Fig. 23. These gages are attached to the carrying plate 43 as shown in Fig. 9. The gages 44, 44, 44 are rigidly attached to the carrying plate 43 but may be adjusted to feed different shaped collar blanks as may be desired.

45 is a sliding bar for the purpose of keeping the carrying plate 43 in a horizontal position. The plate 43 moves horizontally across the machine and parallel with the plates 40, 41 and 42 and the gages 44 extend through the slots of said plates and take the blanks from these plates and deposit them upon the carrying plate 43 beyond the said plates. The carrying plate 43 is operated by the endless chain 46. The carrying plate 43 is attached to the endless chain by any suitable means, preferably by the sleeve 47 as shown in Figs. 19 and 21.

48 is the shaft upon which the sleeve 47 is loosely mounted. The chain 46 is attached to this sleeve by means of the rivets or bolts 49, 49 which are also pivoted to the sprocket chain. The shaft 48 and sleeve 47 travel with the sprocket chain. Upon the shaft 50 is mounted the sprocket wheel which drives the chain. The sprocket chain at the other end of the plates is driven by the sleeve 51 which is loosely mounted on the shaft 52. The sleeve 51 has the sprocket on one end fixedly attached thereto. These sprockets mesh with the sprocket chain and drive the sprocket chain on the other end of the plates and keep the same parallel with the sprocket chain 46.

Fig. 5 shows the collar blanks between the stationary plates 40, 41 and 42. When in this position the carrying plate 43 is in a starting position. Fig. 6 shows the carrying plate having moved the collar blank between the stationary plates 41 and 42 and comes nearly under the collar blank which is between the stationary plates 40 and 41. The carrying plate 43 continues until said plate reaches the position beyond the stationary plates as shown in Fig. 7, the gages in the meantime move the collar blanks between the stationary plates until they reach the position shown in Fig. 7 beyond the stationary plates and the collar blanks then resting upon the carrying plate 43. The carrying plate 43 being carried by the endless chain descends carrying the collar blanks until it reaches the position shown in Fig. 8 at the lower level of the machine. The carrying plate 43 is provided with slots and when the carrying plate reaches the lower level of the feeding machine the gages 53, 53 extend through the slots between the machine and the collar blanks. The gages 53, 53 are of any desired number and are attached to the base of the machine. Thus when the endless chain continues to move carrying with it the carrying plate 43 these gages hold the collar blanks from moving with the carrying plate and the collar blanks are deposited on the bed-plate of another machine or a table as shown in Fig. 9. The blanks are then in position for such treatment as may be desired. The endless chain continues to travel and carries the carrying plate to the starting position.

It is evident from the work accomplished that the carrying plate must be timed with other parts of the machine so that the carrying plate will stop and wait until the collar blanks are between the plates and the blanks must be between the plates in the order described. The carrying plate 43 is arranged to start when the collar blanks are in position between the stationary plates. This is accomplished by the mechanism shown in Figs. 33, 34, 35 and 36 and parts are also shown in Fig. 23. The mechanism of the feeding machine is driven by any suitable power as by the power pulleys 54 and 55. The pulley 54 is mounted loosely upon the sleeve 56 and the pulley 55 is mounted fixedly upon the same sleeve. The beveled gear 57 is mounted fixedly upon that same sleeve and drives the beveled gear 58 and the shaft 59. The shaft 59 drives the feeding mechanism of the feed rolls of the machine. The shaft 60 operates the carrying plate through the sprocket wheel 63 which is fixedly attached thereto. Keyed to the shaft 60 and slidably mounted thereon is the clutch 62. The clutch 62 is constructed to slide along the shaft 60 until it engages the pulley 55 when the clutch revolves with the pulley 55 and the sleeve 56 and thus revolves the shaft 60 which in turn revolves the sprocket wheel 63 and the endless chain 46 carrying with it the carrying plate 43. The endless chain 46 carrying the sleeve 47 until the sleeve 47 reaches the sprocket wheel 63 at which time the flange of the sleeve 47 strikes the lever 64.

As shown in Fig. 35 the lever 64 is hung upon the bent shaft 65, Fig. 34, causing said shaft 65 to rotate in its bearings and causing the arm 66 which is fixedly attached to said shaft 65 to press against the beveled side of the clutch 62, causing the clutch to move outwardly out of contact with the pulley 55 and thus stopping the movement of the shaft 60 and the intermediate connections and the carrying plate 43.

When the goods leave the belt 3 and pass through the rollers 36 and 37 and between the plates 41 and 42 the rollers 36 and 37 again make an electrical contact and energize the magnet 35 of the timing mechanism. This brings down the end of the rocking arm 13 located over that magnet and brings down the lever 67 attached to shaft 68 and rotates the shaft 68 the end of which is bent as shown in Figs. 33 and 34. The end of the shaft 68 comes in contact with the lever 64 and presses that away and off from the flange 47. The lever 64 at the same time moves toward the sleeve 47. This revolves the shaft 65 carrying with it the arm 66 and moves the end of the arm away from the beveled end of the clutch 62 and permits the spring 69 to move the clutch into contact with the wheel 55 and again starts the shaft 60 through intermediate connections carrying the sprocket chain 46. This operation is repeated automatically during the progress of the same.

In starting the machine so that the linen or outside of the blank shall be first deposited between the lower plates 41 and 42, I provide the pawl 70 to engage the teeth of the ratchet 15. This pawl is attached to the switch lever 34, Fig. 18, and when the lever 34 is moved in position to make the circuit the pawl 70 moves the ratchet 15 so that the teeth come in position to allow the pawl 25 and the bar 28 to come in position with the corresponding plate making the electrical contact and magnetizing the magnet 35.

The rolls 71 and 72, 73 and 74, as shown on Figs. 12, 13, 14 and 15, are loosely mounted upon shafts which revolve in their bearings. The bottom rolls 72 and 74 are mounted on the same shaft. The upper rolls 71 and 73 are mounted upon independent shafts. The endless conveyer 3 passes between the rolls 71 and 72 and the endless conveyer 4 passes between the rolls 73 and 74. The upper shafts upon which the rolls 71 and 73 are mounted are independent so as to allow variations in the thickness of the goods passing between them upon the conveyer. The purpose of these rolls is to hold the second layers of goods carried upon the endless conveyers upon the conveyers while the first layers of goods are being drawn through by the feed rolls 36 and 37.

75 is a spring of any suitable form for holding the rolls with uniform pressure upon the goods placed upon the endless conveyers. These rolls are adjustably mounted upon the frame of the machine so as to be used with goods of different lengths and the location of the rolls along the conveyers may be adjusted to suit the length of the goods by any suitable means as by the hand wheel 76 mounted upon the end of the screw 77. The endless conveyers are driven by the feed rolls 8 and 9 which may be geared or belted to their rolls in any suitable manner. The endless conveyers passing between the other rolls drive the other rolls. The goods are combed out and deposited upon the conveyers 1 and 2 as may be desired. The goods follow the conveyers and pass between the rolls as may be desired and are fed one at a time between the rolls 36 and 37 as above described.

After the goods pass between the rolls 36 and 37 they are carried between the stationary plates 40, 41 and 42 by the gage rolls 78 and 79. These rolls are provided with flanges 80, 80 which extend through slots in the stationary plates 40 and 41 so that the goods passing between the rolls 36 and 37 come in contact with the flanges 80 and are carried on between their respective plates. The rolls 78 and 79 are suitably mounted upon the shafts which are driven by a train of gears of any suitable construction from the roll 36. When the goods are being fed by one of the conveyers between the rollers 36 and 37 at one end of said rollers the goods break the electrical contact. In order to break the electrical contact the roll 36 must be raised uniformly from contact with the roll 37. Otherwise the contact would not be broken. In order to accomplish this I locate the bearings of the shaft of roll 36 in links 81, 81, the other end of said links being fixedly mounted upon the shaft 82. The shaft 82 is pivotally mounted between two point screws 83, 83 at each end of said shaft, which screws pass through the frame of the machine. In the operation of my feeding machine it is preferably attached to another machine for treating the goods after they have been deposited by the carrying plate upon a table or bed-plate of the other machine. For example, this particular feeding machine is arranged to be operated with the folding machine for which I have applied for a patent, which application is of even date with this application.

Fig. 3 shows electric switches 84 and 85 attached to the rear portion of the machine underneath the stationary plates and alongside the endless chain. These switches 84 and 85 are adjustably attached to the feeding machine so that they may be properly arranged for timing with the folding machine with which the feeding machine is connected. Wires lead from the switches 85 and 84 to the magnets of the folding machine forming a circuit when closed. As the endless chain passes around the feeding machine conveying the carrying plate the flange 61 on the sleeve 47 strikes the switch 85 causing the same to make an electrical contact and energizes the magnet to which the wire leading from that switch is attached to the folding machine. The goods are deposited on a table or bed plate of the folding machine ready to be operated on by that machine. As the endless chain continues to travel the flange 61 forming a part of the sleeve 47 leaves the switch 85 and strikes the switch 84 and makes an electrical contact. This operates the folding machine to which the feeding machine is attached.

Referring to Fig. 4, it will be seen that member 86 upon which the goods from the carrying plate 43 are deposited is the bed-plate of the folding machine as described in my accompanying application Serial No. 793,355, filed October 4, 1913. After the collar blanks are deposited from the carrying plate 43 upon the bed-plate of the folding machine they are folded over the die on the folding machine and carried by the die to the receiving table 87 and deposited thereon when the die is collapsed. The two machines are designed to be operated together but either machine may be operated independently of the other and the goods may be deposited upon the bed-plate of the folding machine by hand or by any other feeding machine and the feeding machine may be used for feeding the goods to a pasting or other machine as may be desired.

The operation of my feeding machine is as follows:—Blanks of one quality are deposited on the conveyer 1 and blanks of a different quality are deposited on conveyer 2. These blanks are combed out so that the rolls will catch only one blank at a time. The machine is then started and the conveyers 1 and 3 start first. Each feed roll drives the respective conveyer mounted upon it on that side and also, by means of the intermediate rolls, drives the corresponding conveyer on that side. In the same manner the other feed roll drives the opposite conveyers. In starting the machine the operator starts conveyer 1 by hand and moves it until the blank upon conveyer 1 enters between the rollers 36 and 37. The conveyer 2 does not move until the blank from conveyer 1 enters between the rolls 36 and 37 and the blank passing between those rolls breaks the electrical contact and causes the conveyer 1 to stop with the remaining blanks. The rolls 36 and 37 continue to revolve and deposit the blank between the plates 41 and 42 beyond the rolls. When the blank leaves the rolls 36 and 37 the electrical contact is made between those rolls and the conveyer 2 starts and presents its blank between said rolls. As soon as that blank enters between the rolls the electrical contact between said rolls is broken and the conveyer 2 ceases to move the remaining blanks. The rolls 36 and 37 continue to revolve and deposit the blank between the plates 40 and 41. When the blank from conveyer 2 leaves the rolls 36 and 37 the electrical contact is again made between said rolls and conveyer 1 is again started and at the same time the conveyer plate 45 is started and the catches upon the movable conveyer plate 45 extending through the slots in the plates 40 and 41 and 42 moves the blanks already deposited upon those plates outwardly until they rest on the plate 43 and the plate 43 descends and deposits the blanks against the gage 53 and down on the bed-plate of the folding machine.

By using my feeding machine with a folding machine as shown, one operator is enabled to operate two or more folding machines and the machines operating automatically they feed and fold collars much more rapidly and accurately than is possible to be done by hand operated machines. Neither do the machines depend upon the skill of the operator for speed at which the collars may be handled. By using the machines together pasting collar blanks together is dispensed with, saving time and labor in manufacturing. The feeding machine feeding the collar blanks accurately upon the bed-plate of the folding machine and the folder-plates of the folding machine folding the blanks over the die and they being folded and pressed in that manner, the pasting together of the blanks is not necessary. The machines being operated automatically together the operation of folding the collars is much less laborious than by hand operated folding machines.

What I claim as my invention and desire to secure by Letters Patent is,

1. In a machine of the class described a frame, a series of rolls mounted upon shafts having bearings attached to said frame, two of said rolls being feed rolls and adapted to carry endless conveyers, endless conveyers mounted upon said rolls and adapted to receive goods deposited on the surface thereof, receiving plates attached to said frame, a clutch located between said feed rolls, a rocking arm pivoted upon said frame, a clutch fork mounted upon said rocking arm, and adapted to move said clutch into engagement with said feed rolls one at a time whereby goods deposited upon the surface of said conveyers will be alternately fed on said receiving plates.

2. In a machine of the class described a frame, roller bearings in said frame, a series of rolls mounted upon shafts adapted to turn in the bearings, endless conveyers mounted upon said rolls, said conveyers driven by feed rolls, said feed rolls mounted loosely upon the same shaft, a rocking arm mounted upon said frame, a clutch fork mounted upon said rocking arm, a clutch slidably mounted upon the same shaft with said feed rolls and adapted to drive said feed rolls, said clutch fork adapted to slide said clutch into engagement with each of said rolls one at a time, magnets mounted upon said frame under the ends of said rocking arm, means for magnetizing said magnets alternately whereby said rocking arm will rock alternately tilting said clutch fork so as to move said clutch into engagement with said feed rolls, substantially as described.

3. In a machine of the class described a frame, roller bearings in said frame, a series of rolls mounted upon shafts adapted to turn in the bearings, endless conveyers mounted upon said rolls, said conveyers driven by feed rolls, said feed rolls mounted loosely upon the same shaft, a rocking arm pivoted upon said frame, a clutch fork mounted upon said rocking arm, a clutch slidably mounted on the same shaft with said feed rolls and adapted to drive said feed rolls, said clutch fork adapted to slide said clutch into engagement with each of said rolls one at a time, magnets mounted upon said frame under the ends of said rocking arm, means for conducting electricity through a pair of said rolls to said magnets alternately whereby said magnets will be alternately magnetized rocking said rocking arm and thereby causing said clutch to alternately engage said feed rolls.

4. In a machine of the class described a frame, a series of rolls mounted upon bearings in said frame, endless conveyers mounted upon said rolls, two of said rolls being feed rolls, means for alternately revolving said rolls, a pair of additional rolls adapted to take the goods which have been deposited on the surface of the endless conveyers, a shaft mounted in said frame, one of said additional rolls mounted on the shaft fixedly mounted in said frame and the other of said rolls fixedly mounted on the shaft turning in bearings mounted upon swinging arms which arms are mounted upon a parallel shaft which is pivoted between screw points at the opposite ends of said shaft, a shaft pivoted between screw points at the ends thereof and a parallel shaft turning in bearings mounted upon swinging arms.

5. In a machine of the class described a frame, a series of rolls mounted in bearings in said frame, endless conveyers mounted upon said rolls, a rocking arm pivoted upon said frame, a clutch fork mounted upon said rocking arm adapted to move said clutch from one feed roll to the other, electromagnets located under each end of said rocking arm, switch mechanism for controlling said magnets, a ratchet wheel mounted upon said frame, an arm attached to the shaft of said ratchet wheel and adapted to turn the same, said arm being adapted to be moved by one of the magnets under said rocking arm, pawls attached to said arm and adapted to move said ratchet wheel, intermediate connections between said ratchet wheel and the switch mechanism whereby the movement of said ratchet wheel will close the circuit and energize said magnets alternately.

6. In a machine of the class described a frame, a series of rolls mounted in bearings in said frame, endless conveyers mounted upon said rolls, a rocking arm pivoted upon said frame, a clutch fork mounted upon said rocking arm adapted to move a clutch from one feed roll to the other, electromagnets located under each end of said rocking arm, ratchet wheels mounted upon a shaft with bearings in said frame, arms attached to the shaft of said ratchet wheels and adapted to turn the same, said arms being adapted to be moved by the magnets under said rocking arm, pawls attached to the shaft upon which the ratchet wheels are mounted and adapted to move said ratchet wheels, an electrical switch mounted on said frame, intermediate connections between said ratchet wheels and said switch whereby the movement of said ratchet wheels will close the electrical circuit therefrom and energize said magnets alternately.

7. In a machine of the class described a frame, rolls mounted in bearings in said frame, endless conveyers mounted on said rolls adapted to feed goods deposited on the surface thereof alternately on different plates, plates adapted to receive the goods thereon, said plates lying in different horizontal planes, means for conveying said goods from said plates and deposit the same one above the other upon a table or bedplate of another machine, as may be desired.

8. In a machine of the class described a frame, rolls mounted in bearings in said frame, endless conveyers mounted on said rolls adapted to feed goods deposited on the surface thereof alternately on different plates, plates adapted to receive the goods thereon, said plates lying in different horizontal planes, a traveling plate adapted to take the goods from said horizontal plates and deposit the same one over the other at the side of the machine.

9. In a machine of the class described a frame, rolls mounted in bearings in said frame, endless conveyers mounted on said rolls adapted to feed goods deposited on the surface thereof alternately on different plates, plates adapted to receive the goods thereon, said plates lying in different horizontal planes, a traveling plate carried by an endless chain, said traveling plate moving horizontally along the stationary plates and carrying the goods therefrom and descending to the lower plane of the machine and depositing the goods one piece over the other at the side of the machine.

10. In a machine of the class described a frame, rolls mounted in bearings in said frame, endless conveyers mounted on said rolls adapted to feed goods deposited on the surface thereof alternately on different plates, plates adapted to receive the goods thereon, said plates lying in different horizontal planes, a traveling plate, an endless chain adapted to carry said traveling plate, means for holding said traveling plate horizontal and parallel with the plates upon which said goods rest, gages attached to said traveling plate and adapted to move said goods from said stationary plates to said traveling plate in carrying said goods to the lower plane of the machine and depositing the same at the side of the machine.

11. In a machine of the class described a frame, rolls mounted in bearings in said frame, endless conveyers mounted on said rolls adapted to feed goods deposited on the surface thereof alternately on different stationary plates, plates adapted to receive the goods thereon, said plates lying in different horizontal planes, a traveling plate adapted to take said goods from said stationary plates, endless chains adapted to convey said traveling plate, a shaft extending from one of said endless chains to another, sprocket wheels mounted fixedly upon said shaft, said endless chains traveling upon said sprocket wheels whereby said endless chain will move uniformly and at the same rate of speed.

12. In a machine of the class described a frame, rolls mounted in bearings in said frame, endless conveyers mounted on said rolls adapted to feed goods deposited on the surface thereof alternately on different plates, plates adapted to receive the goods thereon, said plates lying in different horizontal planes, a traveling plate adapted to take said goods from said stationary plates, endless chains adapted to convey said carrying plate, sleeves carried by said endless chains, flanges attached to said sleeves, intermediate connections whereby the flange of one of said sleeves will move the clutch to stop said endless chain whereby the carrying plate will be stationary until the said goods are upon said plates and ready to be removed therefrom.

13. In a machine of the class described a frame, a series of rolls mounted upon shafts in bearings in said frame, endless conveyers mounted upon said rolls adapted to receive the goods desired to be treated, a rocking arm pivoted to said frame, electromagnets under the ends of said rocking arm, a clutch fork mounted upon said rocking arm; a clutch adapted to be moved by said clutch fork, means for energizing said magnets whereby said clutch fork will slide said clutch to move said endless conveyers alternately, stationary plates adapted to receive the goods to be treated, endless chains adapted to convey a carrying plate to take said goods from said stationary plates, intermediate mechanism whereby said rocking arm will cause said endless chains to travel conveying said carrying plate when the goods are upon said stationary plate in position to be conveyed therefrom.

14. In a machine of the class described a frame, bearings in said frame; shafts adapted to turn in said bearings, a series of rolls mounted upon said shafts in said bearings in said frame, endless conveyers mounted upon said rolls adapted to receive the goods desired to be treated, a rocking arm pivoted to said frame, magnets under the ends of said rocking arm, a clutch, means for magnetizing said magnets whereby said rocking arm will slide said clutch adapted to alternately engage feed rolls and thereby move said endless conveyers alternately, stationary plates adapted to receive the goods to be treated, endless chains adapted to convey a carrying plate to take said goods from said stationary plates, another shaft attached to said frame, a sleeve upon said shaft, a driving pulley fixedly attached to said sleeve, a clutch mounted upon said shaft and adapted to mesh with said driving pulley, an arm attached to said rocking shaft whereby said clutch will be moved into engagement with said driving pulley, a sprocket wheel mounted upon said shaft, said endless chain mounted upon said sprocket wheel.

15. In a machine of the class described a frame, bearings in said frame; a shaft mounted in said bearings, a series of rolls mounted upon said shafts in said bearings in said frame, endless conveyers mounted upon said rolls adapted to receive the goods desired to be treated, a rocking arm pivoted to said frame, magnets under the ends of said rocking arm, a clutch, means for magnetizing said magnets whereby said rocking arm will slide said clutch adapted to alternately engage feed rolls and thereby move said endless conveyers alternately, stationary plates adapted to receive the goods to be treated, separate rolls mounted adjustably in bearings upon said plates, flanges from said rolls extending through slots in said plates and adapted to engage the goods upon said plates, means for revolving said rolls whereby the goods after leaving said feed rolls will be fed along said stationary plates to the required position.

16. In a machine of the class described, a frame, rolls mounted in bearings in said frame, endless conveyers mounted on said rolls adapted to feed goods deposited on the surface thereof alternately on different plates, plates adapted to receive the goods thereon, said plates lying in different horizontal planes, a traveling plate, an endless chain adapted to convey said traveling plate, means for holding said traveling plate horizontal and parallel with the plates upon which said goods rest, gages attached to said traveling plate and adapted to move said goods from said stationary plate to said traveling plate and carry said goods to the lower plane of the machine and deposit the same at the side of the machine, switches adjustably attached to said frame, a sleeve carried by said endless chain, a flange attached to said sleeve, said flange adapted to make an electrical contact with said switches whereby the electrical circuits will be opened and closed to operate a connecting machine upon which said goods are fed from said feeding machine jointly with said feeding machine and said operations be properly timed by the adjustment of said switches regulating the operation of the connecting machine with the deposit of the goods being fed thereon.

In testimony whereof I affix my signature in presence of two witnesses.

EDWARD B. ROBY.

Witnesses:
WALTER E. WARD,
RETA VAN DER VOLGEN.

Copies of this patent may be obtained for five cents each, by addressing the "Commissioner of Patents, Washington, D. C."